United States Patent

[11] 3,572,854

[72] Inventor Gordon T. Danby
Box 12, Wading River, N.Y. 11792
[21] Appl. No. 696,069
[22] Filed Jan. 5, 1968
[45] Patented Mar. 30, 1971

[54] ELECTROMAGNETIC SUSPENSION AND POSITIONING DEVICE WITH INHERENT DYNAMICAL STABILITY IN THREE DIMENSIONS
16 Claims, 28 Drawing Figs.

[52] U.S. Cl. .................................................. 308/10
[51] Int. Cl. .................................................. F16c 39/06
[50] Field of Search ...................................... 308/10;
73/472, 477, (Inquired); 74/5, 5.4, 5.46, 5.6, 5.7

[56] References Cited
UNITED STATES PATENTS

| | | | |
|---|---|---|---|
| 3,175,405 | 3/1965 | Doyle ........................... | 308/10 |
| 3,243,238 | 3/1966 | Lyman .......................... | 308/10 |
| 3,261,210 | 7/1966 | Buchhold ..................... | 308/10 |
| 3,422,765 | 1/1969 | Schoch ......................... | 308/10 |

Primary Examiner—Milton O. Hirshfield
Assistant Examiner—R. Skudy
Attorney—John Farley ABSTRACT: Machine bearings and positioning devices are disclosed which utilize electromagnetic induction between a quadrupole component of magnetic field and a pair of orthogonally arranged closed inductor loops. A quadrupole magnet (a magnet which generates a quadrupole component of magnetic field) is rigidly mounted either upon the movable (or rotor) member or upon the stator member of the device. The closed loops are rigidly mounted upon the other member. The quadrupole magnet is composed of permanent magnets or of ferroelectromagnets, or is an air-cored electromagnet structure. Either or both the magnet and the closed loops can be superconductors. Axial stability is provided either by locating the closed loops partially within and partially without the quadrupole component of magnetic field or by utilizing auxiliary electromagnetic thrust sensitive devices at one or both ends of the shaft of the device.

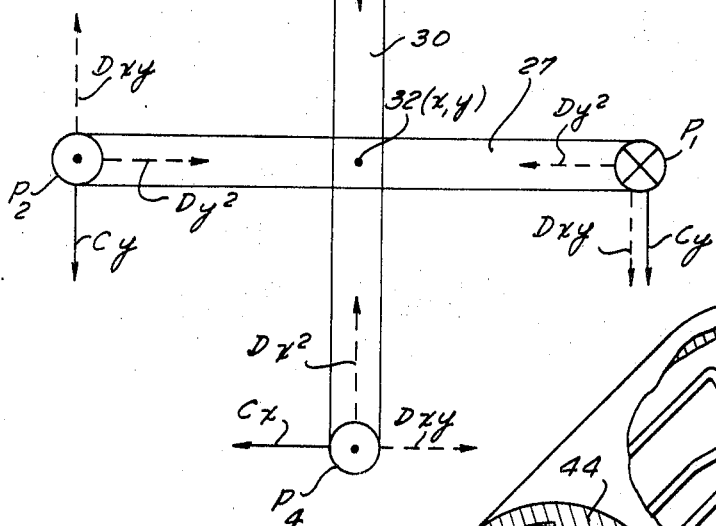
FIG.3
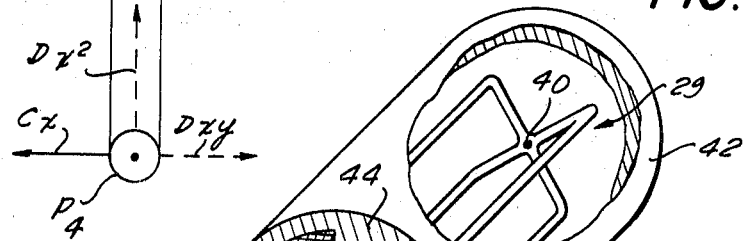
FIG.4
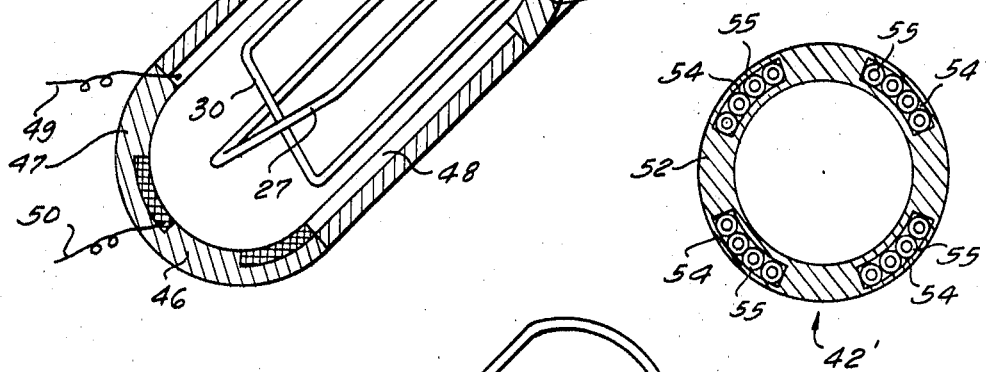
FIG.6
FIG.5

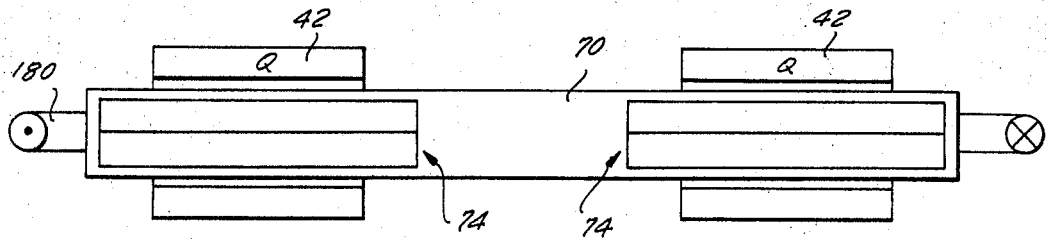
FIG. 18
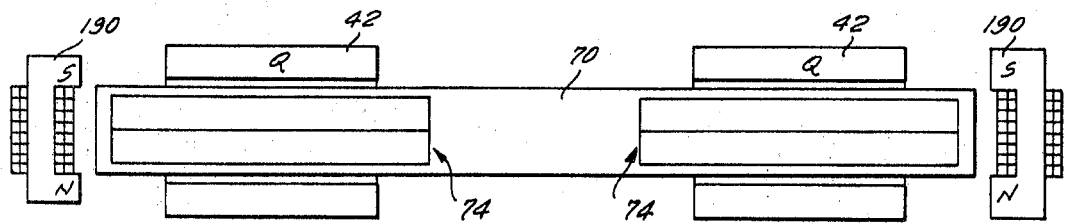
FIG. 19
FIG. 20  FIG. 21
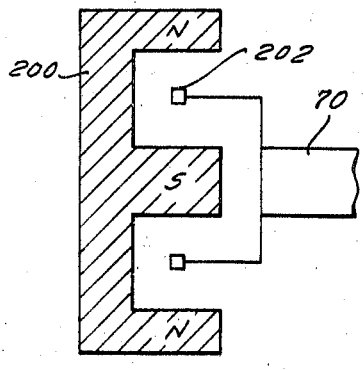
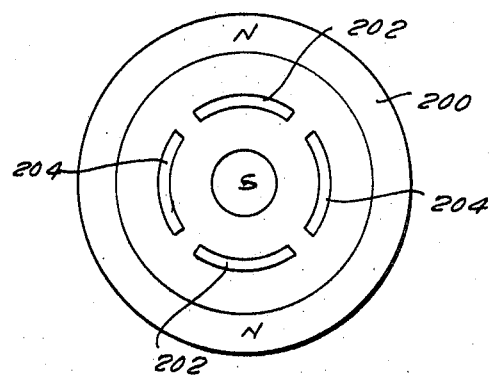

ELECTROMAGNETIC SUSPENSION AND POSITIONING DEVICE WITH INHERENT DYNAMICAL STABILITY IN THREE DIMENSIONS

BACKGROUND

1. Field of the Invention

The invention relates to the suspension and to the positioning of a movable member, with respect to a stationary member, without the need for conventional bearings and without physical contact between the members.

2. Description of the Prior Art

Electromagnetic suspension of solid conductive objects has been reported. See, for example, "Electromagnetic Levitation of Solid and Molten Metals," 23 Journal of Applied Physics, May, 1952, E. C. Okress el al. This article describes levitation of a conductive sphere between a pair of circular current loops, or above one or more circular loops. But there are no definite loops or paths provided in the sphere for the induced currents.

Since the metal is in a lump or mass, the currents flow mainly in local circuits on the outer surface of the metal, in the strongest portions of the magnetic field, where coupling between the field and the currents is close to maximum. A large amount of heat is generated in the metal by these currents. When the lump of metal is in its equilibrium position, the induced currents are in excess of what is needed for suspension and stabilization. The excess heat generated melts the metal. It would be inefficient, indeed it would be impracticable, to use the Okress et al. system as a bearing because the current thus required for suspension and stabilization of a heavy shaft is likely to melt the shaft. Okress et al. do not teach a precise centering, as required in a bearing; they do not teach the precise positioning of a movable member, and they do not suggest the use of superconductors. They observed stabilizing and lifting forces, but the horizontal stabilizing forces were relatively feeble.

In Jul. 1966, Messrs. L. S. Piggott and G. F. Nix referred to the electromagnetic levitation of a conducting cylinder above a dipole loop. Proceedings of the Institute of Electrical Engineers, Vol. 113, No. 7. The suspended object was a metal cylinder. Surface currents induced in the cylinder in the strongest portion of the field, with maximum coupling to the field, again result in wasteful heating. This does not contribute to suspending or stabilizing the cylinder. Horizontal and vertical stabilizing forces were observed, but the horizontal force was again relatively feeble. Piggott and Nix neither suggested superconductors nor referred to the stabilization of the cylinder in the direction of its major axis.

Such phenomenological devices, apart from demonstrating levitation, are very crude devices judged from the point of view of a bearing. For suspension, they rely on a suitably shaped gross magnetic pressure distribution on a conductive surface. Similar suggestions have been made for superconducting surfaces. In this case, heating is not a problem in principle, and bearings could be made using this effect, which has been called the "Meissner Effect." However, even without the limitation of severe resistive heating, the fact that substantial currents do not contribute to suspension inherently limits the efficiency of the system.

An additional limitation imposed by these large nonsuspension surface currents stems from the much greater mutual inductance to the primary. Since this will vary with motion it also produces a severe limitation on the above devices. To control this problem the secondary could be made smaller or could be mounted further from the primary than otherwise would be necessary. This reduces the coupling at equilibrium, and thus reduces the suspension forces generated.

SUMMARY OF THE INVENTION

The invention employs a suspension and positioning member comprising two or more closed loop circuits, constituting a secondary structure mounted on a common central axis and having their planes mutually inclined to each other. The suspension member is placed in a multipole magnetic field, constituting a primary field generated in a primary structure, which suspension member has high stability in all radial directions. Additional means are provided for stabilizing the suspension member in the direction along its central axis.

By a "multipole magnetic field" or a "multipole magnet" herein is meant a magnetic field component or magnet with four (quadrupole) or more poles. A magnetic field or magnet with only two poles will be termed a dipole field or dipole magnet.

The use in a quadrupole component of field, of two inductive loops inclined at right angles, insures equally strong restoring forces for both horizontal and vertical stabilization. This stabilization is independent of the instantaneous angle the loops make with respect to their common axis when rotated. The interaction of dipole currents in the loops with the quadrupole component of magnetic field gives rise to the desired suspension forces. For comparison, if these two loops were replaced by a conductive cylinder, very large circulating surface current, in addition to suspension current, would flow. The circulating surface current would generate heat but would produce no lift.

The application of the field induces a current in each loop. This induced current sets up a counterflux, in opposition to the applied flux, in accordance with Lenz's law. With ordinary conductors, the loop has a definite amount of resistance. Therefore the current will decay with the characteristic time constant of the loop. This requires that the induction be made to vary with time in order to sustain the current. By the introduction of superconductors this decay can be practically eliminated without requiring variable induction.

I assume that the loop is rigid so that it will not deform under mechanical forces generated by the interaction of the magnetic field with the current in the loop. The generated forces will have components such that, if the loop is not mechanically constrained, the loop will tend to move in a direction to reduce the induced magnetic flux threading through itself. These force components are basic to the electromagnetic suspension and positioning hereinafter shown and described.

An important additional feature of the invention is an arrangement of the field and loops in such manner that there is a position of stable equilibrium for the loops in the magnetic field. If it were not for the weight of the loops and the element to be suspended, which latter element is attached to the loop structure, the position of stable equilibrium would be a position where there is no net induction of magnetic field through the loops. In this position, any displacement of the loop structure from equilibrium results in induction through the loops and accompanying restoring forces to urge the loop back toward the equilibrium position. The equilibrium position is one in which a magnetic force is generated that is equal in magnitude and oppositely directed to the force of gravity on the suspended system. To be stable, as before, any displacement of the system from the equilibrium position must create a restoring force to urge the system back toward the equilibrium position. The center of the magnetic field can be effectively moved by means of an additional dipole component of primary field. This makes the field asymmetrical whereby the equilibrium position can be adjusted as desired. For example, the rotor member of a bearing can thus be located upon the central axis of the stator member, instead of permitting the weight of the rotor to depress it below the central axis, or the location of a movable member can be controlled or programmed as desired.

For a superconducting loop, with an applied direct current flux, the induced current will be maintained for an indefinite length of time, commonly for a year or more without significant decay.

If the field is varied with time, e.g., sinusoidally, the resulting induced voltage in the loop is phase-shifted 90° in time behind the varying field. In the case of the resistive loop, the resistive component of the induced current is in phase with the induced voltage. The force of interaction for this resistive current component with respect to the magnetic field is proportional to the product of the sine and cosine of the instantaneous phase angle of the applied sinusoidal variation, causing the force to vary sinusoidally at twice the applied frequency. The inductive component of the induced current in the loop is phase-shifted a further 90° behind the varying field, so that the force of interaction due to the inductive component is proportional to the sine squared, and is negative, i.e. a repulsive force. The since squared term is equivalent to a nonvarying term plus a cosine term of twice the applied frequency.

In summary, inductive impedance in a loop to which a sinusoidal field variation is applied produces an interaction of the loop with the field to generate a force that has a nonvarying component as well as a sinusoidally varying component. The resistive component of current in the loop on the other hand produces only a sinusoidal component of force.

The nonvarying component of force is utilized in this invention to suspend the loop structure against the force of gravity. For practical systems the sinusoidal components can be shown to cause only negligible vibration of the suspended system. Any periodic time-varying induction, due either to a time-varying primary field or to relative motion of the secondary loop structure with respect to the primary, can be treated as equivalent to a fundamental sinusoidal variation together with higher harmonics. In general, the system will behave as in the case of a purely sinusoidal excitation.

Both alternating current primary excitation and rotation of the suspended loops can be used simultaneously without destructive resonance effects, provided some moderate degree of resistive damping is present. In general, for high induction frequencies or for superconducting loops, there must be sufficient damping present. Resistance in the loop circuit or due to eddy currents in the cross section of the loop conductor, if the conductor material is not finely laminated, will provide damping. However, controllable damping can be introduced by means of auxiliary loops either in the primary structure or the secondary structure. For example, two resistive loops can be connected in series opposition to each other and placed in field portions of opposite polarity so that there is no net induction of current flow in the loops when the suspended object is at equilibrium. Rotation of the loops at equilibrium causes no current flow, but translational motion does. This provides a potentially very strong damping factor ready at any time to act directly upon the loop structure.

A feature of the invention is an electromagnetically suspended and stabilized device in which one member is a multipole magnet and the other member comprises two closed conductive loops located in the magnetic field of the magnet, the loops having their respective planes mutually inclined and passing through a central axis common to the loops, together with means to cause electromagnetic interaction between the two members to produce lifting, positioning and stabilizing forces there therebetween.

BRIEF DESCRIPTION OF THE DRAWINGS

FIG. 3 is a force diagram related to the electromagnetic diagram in FIG. 1;

FIG. 4 is a perspective view, partly sectioned, of a bearing structure embodying the invention;

FIG. 5 is a perspective view of a single turn winding illustrative of a portion of the bearing structure shown in FIG. 4;

FIG. 6 is a cross-sectional view of a magnet structure alternative to one shown in FIG. 4;

FIGS. 15 through 19 are modifications of FIG. 7 in which additional axial stabilizing schemes are shown;

FIG. 15 shows a pair of crossed loops for axial stabilization extending partly inside each of the quadrupole magnets;

FIG. 16 shows two crossed loop pairs on the rotor, each provided with an individual dipole magnet on the stator;

FIG. 17 shows two crossed loop pairs accommodated partially within a single dipole magnet on the stator;

FIG. 18 shows a single turn axial stabilizing loop lying in a plane with the axis of the rotor;

FIG. 19 shows individual dipole magnets mounted on the stator near opposite ends of the rotor in coupled relation with the respective crossed loop pairs on the rotor;

FIG. 20 is an elevational sectional view of an axial stabilizing arrangement comprising a circular magnet of E-shaped cross section coupled to quadrupole loops mounted upon one end of a rotor;

FIG. 21 is an end view of the arrangement shown in FIG. 20;

DESCRIPTION OF THE PREFERRED EMBODIMENTS

Figure 1:
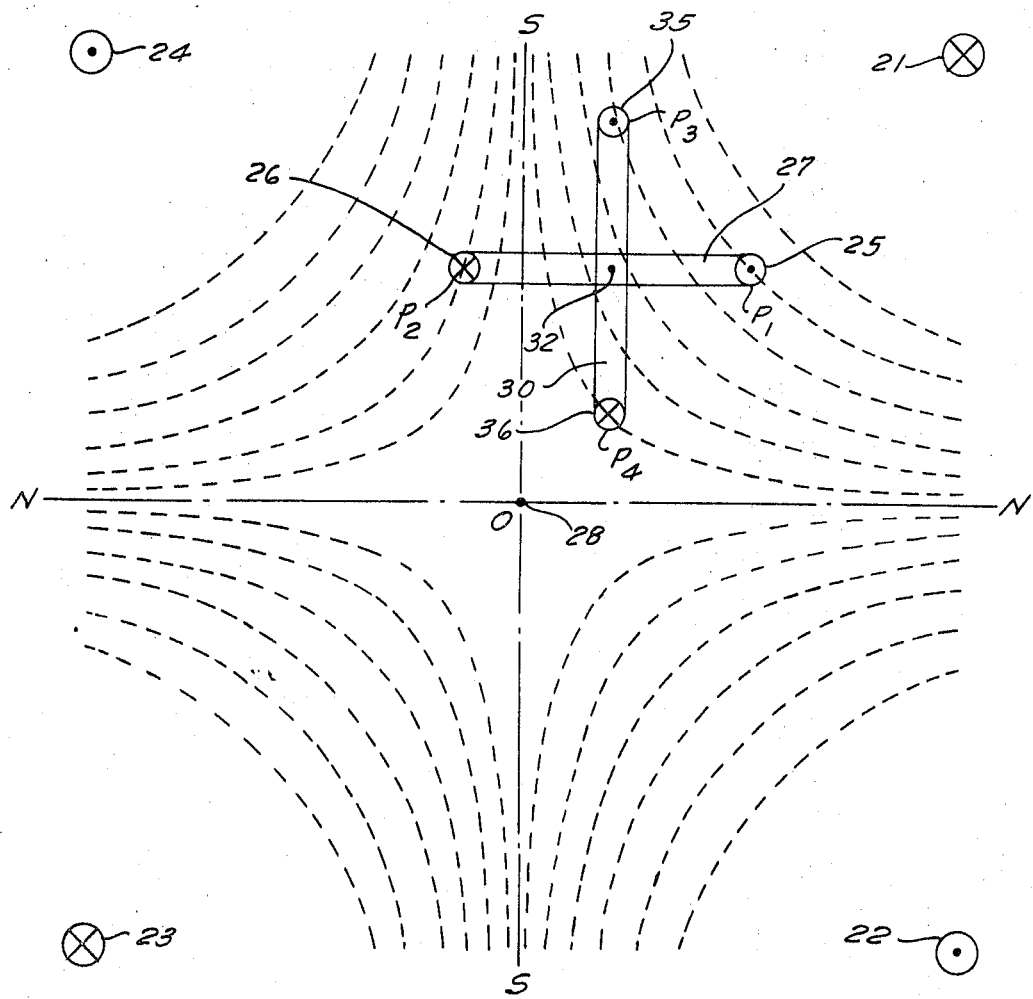
FIG. 1 is an electromagnetic diagram useful in explaining the operation of the invention.

FIG. 1 is plotted upon the usual $xy$-plane with origin at the point 28, in which $x$-values increase toward the right and $y$-values increase toward the top of the sheet. The $z$-axis is assumed to have its positive sense in the direction from the surface of the paper toward the viewer.

FIG. 1 contains an approximate graphical representation of a portion of the magnetic lines of force in a quadrupole magnetic field. A field of this sort can be approximated in practice by four parallel conductors 21, 22, 23 and 24 extending perpendicular to the paper and carrying equal currents. To generate south magnetic poles at top and bottom of the FIG. and north magnetic poles at the sides, as shown in the FIG. current must flow in the negative $Z$ direction in conductors 21 and 23, away from the viewer as indicated by a cross in a circle according to a common convention, and in the positive $Z$ direction in conductors 22 and 24, toward the viewer as indicated by a dot in a circle by the same convention. End connections may form the conductors into two loops, one current going away from the viewer on conductor 21 and returning on conductor 24 to form an upper loop, and another current going away from the viewer on conductor 23 and returning on conductor 22 to form a lower loop. Or, a single loop circuit may be formed in which the current goes away from the viewer on conductor 21, returns on conductor 24, goes away again on conductor 23, returns on conductor 22, and away again on conductor 21. The above described convention for indicating sense of direction will be used where needed herein.

To simplify the mathematics, the magnetic field, which has a horizontal component $B_x$ and a vertical component $B_y$, is defined by $$B_x = -Gx \text{ and } B_y = Gy.$$

Except for end effects, the field is two-dimensional so that $$B_z = 0.$$

To illustrate the interaction of the quadrupole component of magnetic field with a current in a closed loop lying in the field, FIG. 1 shows a pair of conductors 25, 26 extending perpendicularly with respect to the plane of the paper. The conductors 25 and 26 form two opposite sides of a closed loop 27 of width $2w$ in the plane of the field, and of any desired depth $2d$ in the direction perpendicular to the plane of the paper.

Figure 2:
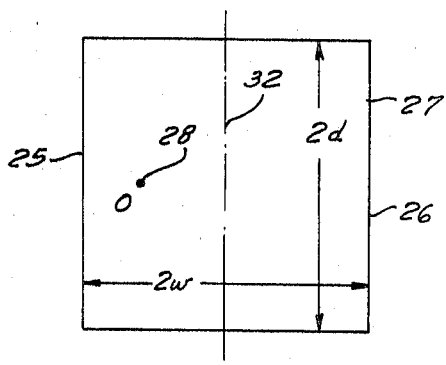
FIG. 2 is a diagrammatic plan view of a current loop employed in an embodiment of the invention.

FIG. 2 shows a plan view of the closed loop 27 looking down from the top of FIG. 1. In FIG. 2, the loop is shown as square, and in FIGS. 1 and 2, the origin of coordinates is shown at the point 28. For present purposes, the plane of the loop 27 will be assumed to be constrained to remain always horizontal and at the location illustrated in FIG. 1. The central axis of the loop 27 is shown at 32, at a point having coordinates $(x,y)$ which point may be chosen at any arbitrary location for the purposes of this analysis. For definiteness, however, positive values of $x$ and $y$ are shown in FIG. 1.

Assuming that the loop 27 is purely inductive, with inductance $L$ per unit depth of the loop, the $y$-component of the flux through the loop 27, per unit depth of the loop, and therefore, the current $I_s$ induced in the loop by inserting the flux into the loop, is determined by the equation $$2wGy = -LI_s.$$

The minus sign takes into account the fact that the current $I_s$ is opposed in direction to the current in the conductors 21, 24 from which the current $I_s$ is chiefly induced, in accordance with Lenz's Law. Accordingly, the direction of the induced current depends upon the sign of $y$ and the magnitude of the induced current is given by $(2wGy/L)$ using the absolute value of $y$. The sign of the current at any point P in the plane of FIG. 1 is determined by its sense along the $z$-axis, which axis has its positive sense in the direction from the surface of the paper toward the viewer.

To calculate the forces applied to the loop by the interaction of field and current, consider the values of the field and current at a point $P_1$ where the conductor 25 intersects the paper in FIG. 1 and at a point $P_2$ where the conductor 26 intersects the paper. The points $P_1$ and $P_2$ are typical of all points on the respective conductors along the depth of the loop other than corner points of the loop. The coordinates of $P_1$ are $(x+w,y)$ and of $P_2$ are $(X-w,y)$, where $x$ and $y$ are the coordinates of the central point 32.

At $P_1$, the current, in vector notation, is $$I_{S1} = 0i + 0j + (2wG/L)k$$

where $i, j, k$ are the usual unit vectors along the respective axes of $X, Y, Z$, and the field, also in vector notation, is $$B_1 = -G(X+w)i + Gyj + 0k.$$

The force $F_1$ at the point $P_1$, per unit depth of the loop, is the vector product of the current vector times the field vector, which product is $$F_1 = -(2wGy^2/L)i - (2wG^2xy/L)j - (2w^2G^2/L)yj.$$

At $P_2$, similarly, $$I_{S2} = 0i + 0j - (2wG/L)yk,$$

$$B_2 = -G(x-w)i + Gyj + 0k,$$

$$F_2 = +(2wGy^2/L)i + (2wG^2xy/L)j - (2w^2G^2/L)xj.$$

Using the following abbreviations:

$$C = 2w^2G^2/L,$$

$$D = 2wG^2/L,$$

the forces may be written simply as $$F_1 = Dy^2i - Dxyj - Cyj,$$

$$F_2 = +Dy^2i + Dxyj - Cyj.$$

The various force components are shown graphically in FIG. 3. The opposing force components of magnitude $Dy^2$ acting in the $x$-direction produce only internal stresses in a rigid loop and no tendency to translational motion for any loop location. The opposing force components of magnitude $Dxy$ constitute a force couple exerting a torque tending to rotate the loop clockwise viewed in the FIG. It will be seen below that by using two loops rigidly fastened together and mutually perpendicular, an equal couple is created which opposes and annuls the first couple.

The significant force components for the purpose of this invention are the equal components of magnitude $Cy$ acting both in the same sense along the $y$-direction, which combine to tend to move the loop toward a vertical position of equilibrium in the weakest portion of the magnetic field, which is at the location of the $x$-axis. It will be noted, however, that there is no component of force tending to move the loop in its own plane, i.e. in the direction of the $x$-axis to provide horizontal equilibrium.

To provide for a horizontal position of equilibrium, in addition to the vertical position of equilibrium afforded by the single loop in a horizontal plane, as well as to annul the couple which is effective upon the single loop, a second loop 30 is added at right angles to the first loop and having its central axis in coincidence with the central axis of the first loop. The common axis goes through the point 32 having the coordinates $(x,y)$, and the planes of the respective loops 27 and 30 pass through the common axis of the loops.

The calculations for the second loop 30 are identical in form to those given above for the loop 27 except that $i$ and $j$ components are interchanged and the variables $x$ and $y$ are also interchanged. The points of intersection $P_3$ and $P_4$, respectively, of the loop 30 with the plane of the paper are at the point 35 having the coordinates $(x, 4+w)$ and the point 36 having the coordinates $(x, y,-w)$. The force $F_3$ of interaction at point $P_3$ and the force $F_4$ at the point $P_4$ are found to be as follows:

$$F_3 = -Dxyi - Dx^2j,$$

$$F_4 = +Dxyi - Cxi + Dx^2j.$$

Here again, there are opposing force components, this time of magnitude $Dx^2$ acting in the $y$-direction which produce only internal stresses in the rigid loop 30. The opposing force components of magnitude $Dxy$ constitute a couple equal and opposite to the couple acting upon the loop 27, so that the two couples annul each other. The significant force components acting upon the loop 30 are the equal components of magnitude $Cx$ which act both in the same sense along the $x$-direction and tend to move the loop 30 toward a horizontal position of equilibrium in the weakest portion of the magnetic field, which is at the location of the $y$-axis. Again, there is no component of force effective upon the loop 30 to move the loop in its own plane, i.e. in the direction of the $y$-axis.

It will be evident that, neglecting weight, the combination of the two loops is urged toward both horizontal and vertical positions of equilibrium, that is, the common axis of the loops is urged toward the point 28 having the coordinates $(0,0)$.

Because of weight, the equilibrium position will be moved downward from (0,0) to (0,Yo) where $$Yo = \frac{mg}{2C}$$

and where $mg$ is the weight per unit length suspended.

The loops 27 and 30 must be conductively separate, except that there may be one point of connection between them. The system so constituted has a restoring force which is proportional to displacement in the $X$ and in the $Y$ directions, independent of motion. It can be shown that the restoring force is present even though the loop system is rotated about its axis and it can be shown that the magnitude of the restoring force does not vary whether the system is at rest or in rotation. In other words, the loop system is free to rotate about its axis. Thus, the loop system behaves as a harmonic oscillator, with harmonic restoring forces, free to oscillate about its central axis independent of rotation.

The maintenance of a continuing restoring force requires that a current be maintained in a conductor in the magnetic field. The necessary current may be initially induced in a superconductor, or else there may be a time-varying relation between the conductor and the field to continually induce the current. Usually, the time variation will be periodic. The variation can be caused either by a time-varying amplitude of the primary magnetic field acting upon a fixed conductor, or by a nonvarying primary field interacting with a moving conductor. Varying amplitude of the primary magnetic field may be obtained either by actual variation of the field in the primary member or by moving the primary member with reference to the fixed conductor. Relative motion of the two members may be either rotation or translation, the motion in either case causing a change in the electromagnetic coupling between the two members. There may also be combinations of the two cases, for example, a rotating loop in an alternating primary field. If the time variation is periodic, the effect is equivalent to the sum of a sinusoidal variation of the same periodicity plus higher harmonic variations. The resulting force at any time may be described as the sum of the forces due to these sinusoidal components.

FIG. 4 shows an illustrative embodiment of two bearing members embodying the invention. The loops 27 and 30, shown shown schematically in FIGS. 1 and 3, form a suspension member 29, mounted in mutually perpendicular fashion. The loops do not touch each other except at a single point 40 where they may be conductively connected as by soldering, brazing, or the like. Surrounding the loop structure is a hollow cylindrical quadrupole magnetic structure 42, illustrated as an electromagnet, which may be composed of iron or other ferromagnetic substance, and which has pole pieces 44, 45, 46, 47. The exciting winding for the pole pieces is shown at 48 and may be either a multiturn winding or a single turn, with ends coming out at 49 and 50, the winding scheme being shown for a single turn in FIG. 5. Alternatively, the member 42 may be a permanent magnet, requiring no winding.

FIG. 6 shows a quadrupole magnet structure 42' which is alternative to the form shown in FIG. 4. In the structure 42', the hollow cylinder 52 is composed of nonmagnetic material, suitably laminated if metallic, and contains longitudinal recesses 54 in which a superconductor winding or windings 55 are threaded according to the winding scheme illustrated in FIG. 5, thereby providing substantially an air-cored magnet. The structure shown in FIG. 6 is particularly suitable for use with a superconductive winding, but can be normally conductive.

An illustrative construction for superconducting winding 55 is described by Dr. J. T. powell and me in our U.S. Pat. application, Ser. No. 684,775, filed Nov. 21, 1967. See, particularly, FIG. 1A of that application.

Figure 7:
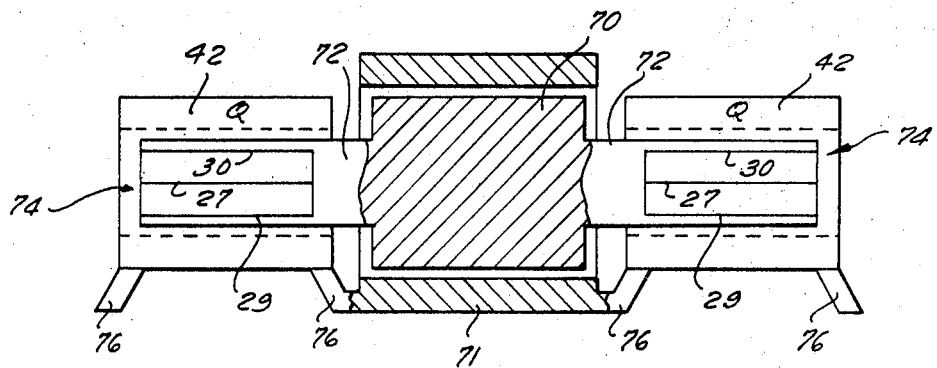
FIG. 7 is a schematic sectional view of an electromagnetic bearing with quadrupole magnets in the stator and crossed dipole magnets in the rotor.

FIG. 7 shows an illustrative pair of bearings for a horizontal shaft using electromagnetic suspension in accordance with the invention. A rotor of a rotatable machine (a machine having at least one rotatable element) is represented schematically at 70 and a cooperating stator at 71. At each end of the rotor 70 is a rigid extension 72 composed of nonmagnetic material of suitable strength and either nonconductive or else laminated. The extension 72 is cylindrical and has a concentric hollow tubular end section 74 within which is rigidly mounted a double loop suspension structure 29 of the type shown in FIG. 4. For clarity in FIG. 7 and following FIGS. the structure 29 is represented symbolically by a rectangle with a single central line parallel to the long sides of the rectangle. Stator portions of the bearing constitute a pair of quadrupole magnets Q, illustrated symbolically as of the type of structure 42, although structure 42' or other suitable magnet structure may be substituted. The quadrupole magnets each surround one of the suspension structures 29 and the quadrupole magnets are rigidly fastened to the ground or to the stator portion of the rotatable machine, as by means of feet 76.

The member 70 is not necessarily a rotor but may be a movable part of a positioning device, for example, a tool positioning means. If a rotor, the member 70 may be a part of any rotatable machine, such as an induction motor, an air driven turbine, etc., driven in the usual manner.

The loops 27 and 30 may be ordinary conductors, e.g., aluminum, and may be air cooled by the motion of the rotor. In a case where the rotor turns in a vacuum chamber, the loops can be cooled by radiation to a cold heat sink. Alternatively, the loops 27 and 30 may be superconductors, in which case, the rotor must be supplied with cryogenic fluid, e.g., liquid helium, and periodically refilled. If the quadrupole magnet is operated with an alternating field, e.g., 60 cycles per second, rotation of the rotor is not required for lift, and the bearing functions at all speeds of rotation. If the quadrupole magnet has direct current excitation or is composed of permanent ferromagnets, there is no lift without rotation with ordinary conductive material in the suspension loops. In such case, crude loose fitting bearings, or retractable end bearings, or other temporary support means are required at starting and stopping.

In the embodiment shown in FIG. 7, the suspension loops 27 and 30 are everywhere well inside the quadrupole magnet structure 42 with the result that there is no net force along the main axis of the rotor, so if the shaft of the rotor is mounted horizontally there is nothing to prevent drift of the rotor along that axis. If mounted vertically, there is nothing to hold up the weight of the rotor. Supplementary arrangements for providing stability along the main axis of the rotor are shown in certain of the remaining figures.

Figure 8:
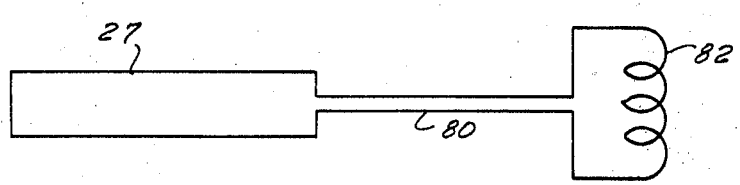
FIG. 8 is a detail schematic showing an auxiliary inductor connected to a current loop to increase the inductance of the loop.

Increased inductance of the suspension loops 27 and 30 is in some cases desirable in order to increase the loop time constant $L/R$ and adjust the loop current value at a given location in a given magnetic field. For this purpose, a loop, e.g., loop 27 is shown in FIG. 8 as connected serially by leads 80 to an inductor 82 which is outside of the primary field. Since, in the embodiment shown in FIG. 7, the quadrupole magnet is at rest, it can be cooled in any suitable manner.

Figure 9:
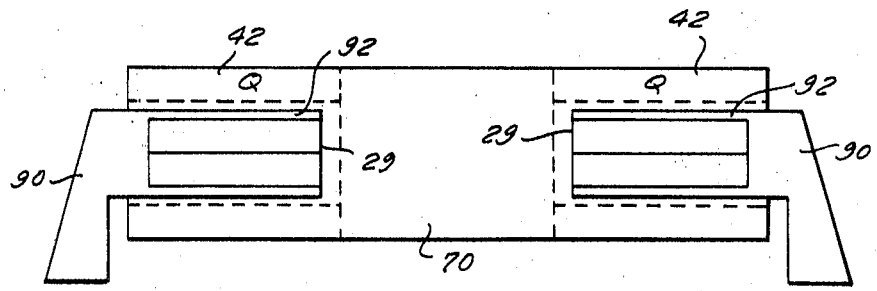
FIG. 9 is a schematic sectional view of an electromagnetic bearing with crossed dipole magnets in the stator and quadrupole magnets in the rotor.

An embodiment shown in FIG. 9 is similar to that of FIG. 7 except that the rotor 70 carries the quadrupole magnets and the suspension loops are attached to the stator. The quadrupoles 42 form cylindrical hollows at the two ends of the rotor structure, into which the suspension loop structures extend, supported by brackets 90. The brackets are rigidly attached to the ground or to the stator portion of the machine. Attached to or integral with each bracket 90 is a hollow cylindrical member 92 composed of nonferromagnetic, nonconductive, or laminated material, in which hollow member is rigidly mounted the suspension member 29.

In the embodiment shown in FIG. 9, since the suspension loops 27 and 30 are at rest, they can be cooled in any of the usual ways, including water cooling, so that very large induced currents may be accommodated in ordinary conductors. This embodiment is also especially adaptable to the use of superconductors in the suspension loops, as it is easily serviced with cryogenic liquids. Permanent magnets can be used to form the quadrupole magnets, or superconducting magnets can be used. If superconducting magnets are used the rotating members require periodical servicing. When used in an electric alternator or generator, the quadrupole magnets can be excited by alternating current or direct current produced in the machine. Where desirable, the magnets can be cooled by air flow or by radiation cooling.

Series inductance is conveniently added to the stationary suspension loops. Since weight is no problem in the stator, heavy iron inductors can be used to give lift at very low speeds or with very low frequencies of excitation of the quadrupole magnets.

It is to be understood that while a pair of loops are necessary and sufficient for the purposes of radial stabilization, more than one such pair can be superimposed upon a common axis. In a practical system using ordinary resistive conductors, loops of large conductor cross section suitably stranded to prevent excessive eddy current currents in the conductor cross section may be used. Such a system can be viewed either as a stranded single loop or as several loops in parallel. Multiple loops can be distributed about the loop structure in any manner, provided that, for each loop element, there is a like element inclined at an appropriate angle to the first element.

In all cases, the loop elements of a given pair must be conductively isolated from each other, contacting at no more than one point, so that no currents can flow except in substantially equal current pairs on diametrically opposite sides of the axis. Any shape loop or any array of distributed loop elements restricted as above specified is equivalent to a simple pair of loops in respect to its behavior in providing suspension forces, in any of the arrangements contemplated herein.

ILLUSTRATIVE EXAMPLE

Preliminary calculations indicate that, for an ideal system (purely inductive response) a horizontally mounted bearing of the following illustrative structure can support about 15 times the weight of the loops. This assumes that the bearing comprises two 6 kilogauss quadrupole magnets of 3 cm. radius and two pairs of aluminum suspension loops, each loop being 15 cm. long, 3 cm. wide, and 2 cm.$^2$ in conductor cross section. This assumes also an equilibrium displacement, $y_o$, of —one-fourth cm.

Further calculations indicate that if the above system were subject, at room temperature, to 240 cycles per second of induction (due either to AC quadrupole excitation or to rotation in the DC quadrupole field, or to a combination of the two), the load bearing capacity is 99 percent of the ideal for the same value of $y_o$. Thus the bearing still supports almost 15 times the weight of the loops.

For 60 cycles per second of induction, these calculations indicate that the load bearing capacity is 81 percent and that for 120 cycles per second it is 95 percent.

Figure 10:
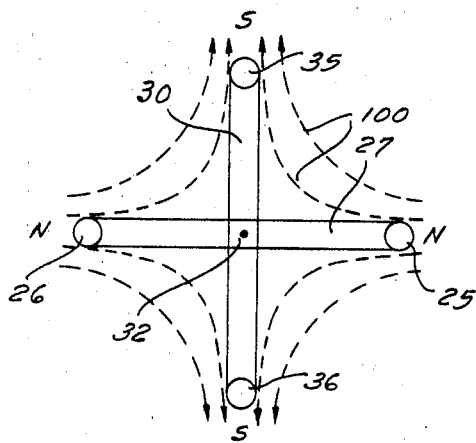
FIGS. 10 and 11, are electromagnetic diagrams representing, respectively, in cross section, crossed loops of the present invention and corresponding current loops on the surface of a metallic cylinder of the prior art.
Figure 11:
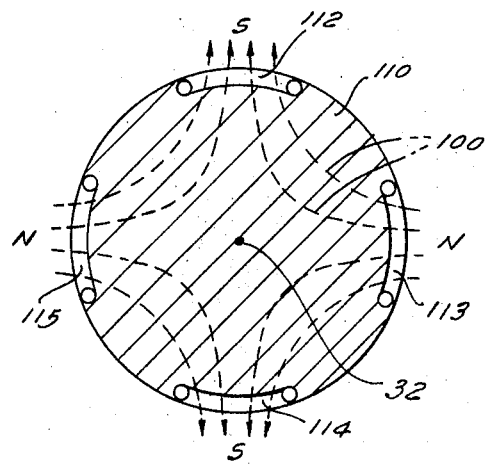

A comparison of FIGS. 10 and 11 will make it more clear how the multiple loop arrangement of this invention provides the required lifting and stabilizing forces while avoiding the excessive heat losses and possible melting of a massive metal member in which large eddy currents are induced. In both FIGS. a few of the lines of flux 100 are shown for the quadrupole component of field of a primary magnet. These lines are intended to represent the field condition before the opposing flux of the secondary loops is introduced. FIG. 10 shows the loops 27 and 30 in the equilibrium position, each loop lying in a region of the weakest magnetic field. If there is relative motion between the quadrupole field and the loop structure, the primary magnetic for field induces substantially equal and opposite electromotive forces in the conductors 25 and 26 with the result that little or no current flows in the loop 27 when the central axis 32 is in the equilibrium position. Similarly, the primary magnetic field induces substantially equal and opposite electromotive forces in the conductors 35 and 36 with the result that little or no current flows in the loop 30 when the central axis 32 is in the equilibrium position. In other words, there is minimum inductive coupling between the primary field and the loop structure, and hence minimum heat loss when the central axis 32 is in the equilibrium position. Any departure of the central axis 32 from the equilibrium position brings into play the large inductive currents required to produce the lifting and the stabilizing needed to maintain the loop structure in the desired location, accompanied by a minimum of heat loss.

FIG. 11 shows a solid cylindrical metal shaft 110, in section, with representative eddy current paths 112, 113, 114 and 115 shown at the regions of the surface portions of the shaft where the principal eddy currents are induced by the primary field. Here, the eddy current loop paths are coupled to the primary a magnetic fil field with substantially maximum coupling, accompanied by maximum heating of the metal of the shaft. Lifting and stabilizing forces produced by the respective eddy current systems nullify one another and only come into play when the central axis 32 departs from the equilibrium position. When this happens, the eddy currents increase under one magnetic pole and decrease under another giving a net force in one direction. There is substantially maximum heating at all times, even when the axis is in the equilibrium position, so that for the most part the effect of the induced currents is constant heating of the shaft, whether or not positioning or stabilizing is needed at any given time.

AXIAL STABILITY

The provision of axial stability will now be treated. When both ends of the loop structure 74 are well inside the magnet structure 42, there is no axial force or resistance to motion of the suspended structure along the direction of the central axis thereof. Axial restoring forces can, however, be obtained by making use of end portions of the field of the magnet, in various combinations, some of which are shown hereinafter. It will not do, however, simply to make the loop structure 74 considerably longer than the magnet structure 42 so that both ends of the loops extend symmetrically well beyond the magnet ends, since in this case it can be shown that there is still no axial force obtainable. In addition to the use of field end effects, separate magnets can be used to obtain axial restoring forces.

Figure 12:
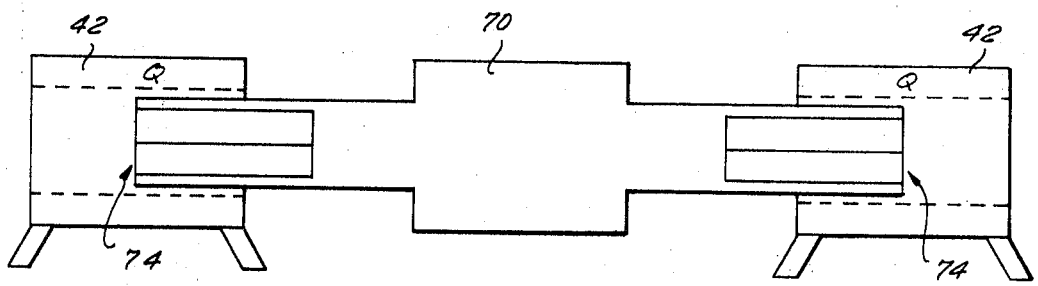
FIG. 12 is similar to FIG. 7 except that the crossed loops of the rotor lie partially inside and partially outside the respective quadrupole structures to provide axial stability of the rotor.

FIG. 12 shows a configuration similar to that shown in FIG. 7, except that the magnets 42 have been moved away from a symmetrical location with respect to the rotor 70 so that the loop structures 74 are partly within and partly outside of the respective magnets 42. The rotor 70 is at equilibrium in the axial direction when the middle of the rotor is centered between the two magnets. In this position, equal forces act upon the two loop structures 74 tending to move the left loops to the right out of the magnetic field of the magnet, and to move the right loops to the left. Consequently, there is a position of stable equilibrium. If the rotor 70 is moved away from the middle position, say to the right, the force to move the right loops out of the field is increased while the force to move the left loops out of the field is decreased, thus providing a net force to move the rotor to the left, back toward the equilibrium position. Similarly, if the rotor 70 is moved to the left, the restoring force is in the direction to return the rotor to the middle position.

Axial stability may also be obtained in like manner if the rotor structure is made longer and the loop structures are arranged to extend beyond the magnets at both ends of the rotor. However, if the loop structures extend beyond the respective magnets both in the same direction, the system will be unstable.

The arrangement shown in FIG. 12 is such as to weaken the restoring forces as compared to those available in the arrangement of FIG. 7, because one end of the structure 74 is outside the primary field. Also, in the arrangement of FIG. 12, the radial and axial restoring mechanisms are coupled together since motion of the structure 74 changes both restoring forces. The arrangement of FIG. 12 may, however, find application where only relatively weak axial disturbing forces are expected.

Figure 13:
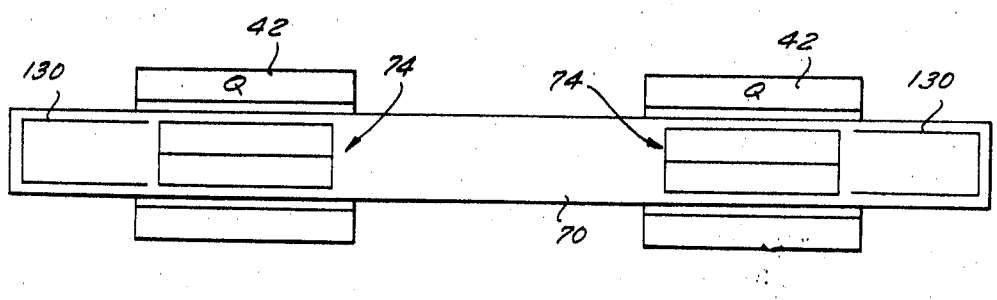
FIG. 13 is similar to FIG. 7 except that axial stabilizing loops are shown at either end of the rotor.

FIG. 13 shows the use of auxiliary quadrupole loops 130 at the respective outer ends of the primary quadrupole field. Each loop 130 is doubled back over itself as shown in perspective view in FIG. 14 and is similar to the loop shown in FIG. 5 with the input and output connections 49, 50, connected together to short circuit the loop. The closed ends of the loops 130 extend slightly into the interior of the respective magnet 42 when the rotor is in the axial position of equilibrium. The radial position of the loop 130 with respect to the loop structure 74 is not important, but for definiteness the loop 130 is shown lying in planes parallel to one of the loops 27 and 30 of the structure 74. The loops 130 are rigidly mounted in the rotor 70 so as to rotate with the rotor. If the rotor 70 is moved to the right, the loop 130 at the left moves into the quadrupole field with the result that a force is generated in the direction to move the rotor back toward the left to restore axial equilibrium. Similarly, if the rotor is moved to the left, the loop 130 at the right moves into the quadrupole field of its respective magnet and the result is to move the rotor back toward the right into the equilibrium position. While the rotor is in the position of axial equilibrium, equal currents are induced in the respective loops 130 with the result that no net restoring force is generated. Alternatively, the two loops 130 can be placed at opposite ends of one of the quadrupole magnets 42.

The induced current in either of the loops 130 is independent of the radial position of the loop 130 and is larger than is induced in the loop structures 74 in the arrangement of FIG. 12 by the same amount of deviation from the position of axial equilibrium. Instead of being mounted outside the respective loop structures 74, as in FIG. 13, the loops 130 may be mounted on the side of the structure 74 nearer the middle of the rotor 70. The loops 130 on the two ends of the rotor can be connected together in series opposing connection, in which case at axial equilibrium, no current will flow in the loops 130. The restoring force is equally strong whether the loops 130 are connected together or are separate. When the system is disturbed from axial equilibrium, a larger electromotive force is generated in the loop 130 which is moved into the quadrupole field than in the loop that is moved out of the field, with the result that a net current flows through the loops 130 and a restoring force is obtained.

Figure 28:
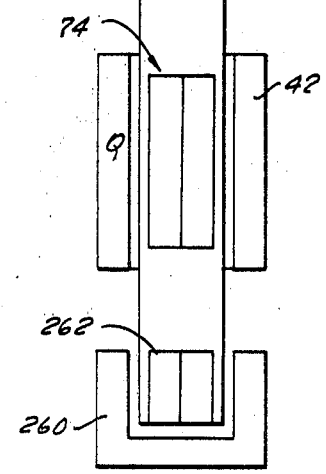
FIG. 28 is a perspective view of a pair of closed, inductive quadrupole loops.
Figure 28:
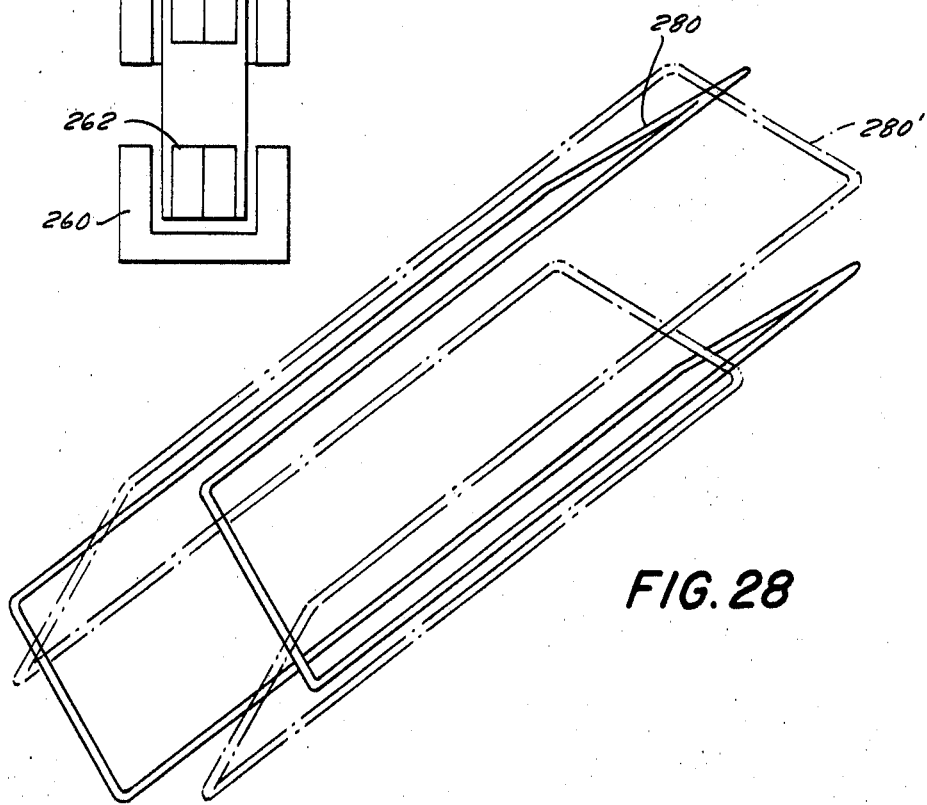

The arrangement of FIG. 13 experiences a rotational torque which tends to rotate the loop 130 to a radial position of minimum induction. When the bearing is being driven, this torque can be overcome by the momentum of the machine. However, the torque can be eliminated by replacing the loop 130 by a pair of quadrupole loops as shown in FIG. 28, in which case the suspension is torque-free and will function even when the machine is not rotating.

Loops 130 can be connected by means of a noninductive pair of conductors in the rotor structure.

Figure 14:
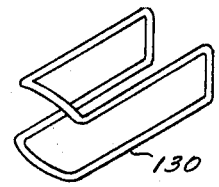
FIG. 14 is a perspective view of one of the axial stabilizing loops shown in FIG. 13.
Figure 15:
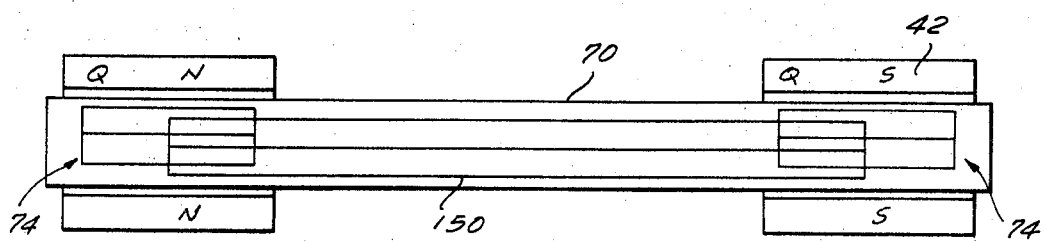

In FIG. 15, the quadrupole magnets at the respective ends of the rotor 70 are so arranged that if in the left magnet, north poles, designated N, appear at top and bottom as viewed in the FIG., in the right magnet, south poles, designated S, appear at the top and bottom. The loop structures 74 are normally centered in the respective quadrupole magnets as in FIG. 7. Instead of the loops 130 shown in FIG. 13, an elongated loop structure 150, comprising a dipole pair similar in form to the structure 74, is rigidly mounted in the rotor 70 with the ends of the structure 150 approximately at the midpoints of the respective loop structures 74. In the condition of axial equilibrium, no current flows in the loop structure 150. Alternatively, the axial restoring member 150 may be a quadrupole loop 130 as in FIG. 14, in which case there is no inductive coupling between radial and axial motion. Again, the member 150 may be a pair of quadrupole loops arranged in the manner shown in FIG. 28, to provide torque-free restoring forces. In the FIG., the members 150 and 74 are shown with their central axes offset, whereas in actuality the central axes are coincident.

Figure 16:
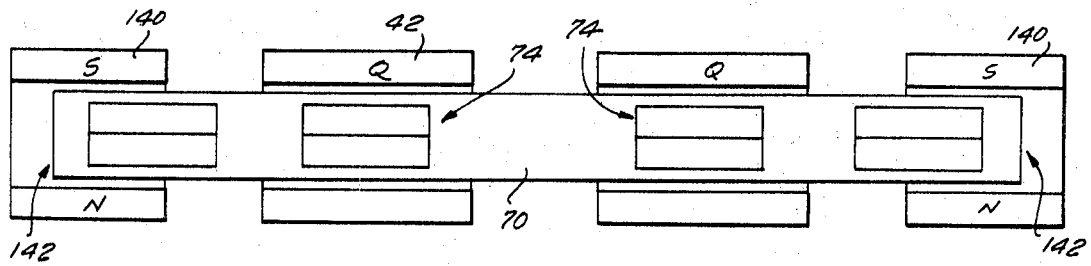

FIG. 16 shows how separate dipole end magnets 140 can be used together with loop structures 142 similar to the loop structures 74 to provide axial stability. The rotor 70 is extended at each end to accommodate the added loop structures 142 and the structures 142 normally extend inwardly into the respective magnets 140 to the middle of the magnet. This arrangement gives strong axial restoring forces that are substantially decoupled from the radial positioning and stabilizing system. Instead of protruding toward the middle of the rotor 70, the loop structures 142 may protrude outside the magnets 140 away from the middle of the rotor. The loops of the structures 142 can be connected in series opposing connection so that at axial equilibrium no current flows in these loops.

Figure 17:
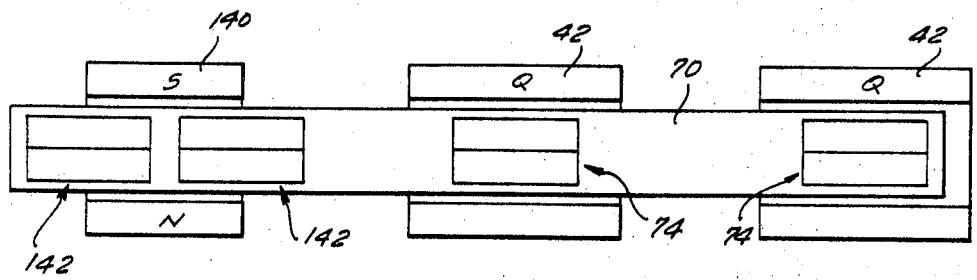
Figure 22:
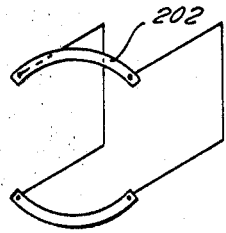
FIGS. 22 and 23 are perspective views of the respective quadrupole loops shown in FIGS. 20 and 21.
Figure 23:
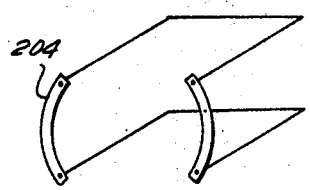

FIG. 17 shows how the two auxiliary loop structures 142 can be coupled to a single dipole magnet 140. The loop structures are noncentrally located within the field of the magnet 140 and protrude equally on both ends of the magnet 140 when the rotor 70 is in the position of axial equilibrium. At equilibrium, the currents are equal and opposite at the center of the dipole magnet 140, where the two loop structures 142 almost touch. Again, if the ends of the loop structures 142 outside the magnet are connected in series opposition, no current flows at equilibrium, but the same restoring force is provided.

FIG. 18 shows how the auxiliary field for the axial stabilization can be provided by a dipole electromagnet comprising a horizontal loop 180 carrying direct current. The loop 180 may be composed of a superconductor. The loop structures 74 are made longer than the quadrupole magnets 42 so that the magnetic flux produced by the loop 180 links with the end portions of the loop structures 74. When either end of the rotor is moved closer to the loop 180, a repulsive force is generated between the structure 74 and the loop 180 which moves the rotor back toward the position of axial equilibrium.

FIG. 19 shows an arrangement similar to that of FIG. 18 except that the loop 180 is replaced by ferroelectric magnets 190, one at each end of the rotor 70. The magnets 190 can also be permanent magnets.

In the cases of FIGS. 18 and 19 the elements 74 are sufficiently long to protrude out of both ends of the quadrupole so that no axial force is present due to the quadrupoles. However, the ends of the element 74 protrude into the dipole magnets 180 and 190 and serve the additional purpose of elements 142 in FIG. 16. However, as in the arrangement of FIG. 12, there now exists coupling between radial and vertical motions. Because of this coupling the magnets 180 or 190 can also be used, for example, to adjust the vertical position of the axis of the rotor.

FIGS. 20—25 show ways in which axial stabilization can be provided by means of E-shaped cross section magnets having an outer ring portion of one polarity and a central portion of the other polarity.

Figure 24:
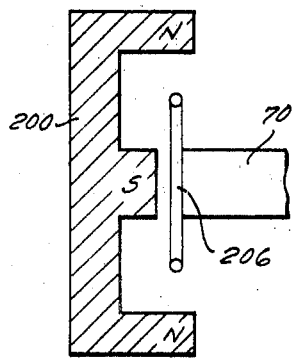
FIG. 24 is similar to FIG. 20 except that it shows a single circular loop concentric with the axis of the magnet.

FIGS. 20 and 24 show such magnets, one or either of which is to be mounted opposite each end of the rotor. Various forms of coupling loops may be provided rigidly attached to the end of the rotor and extending into the magnetic field of the magnet 200.

FIGS. 20—23 show the magnet 200 coupled to a pair of coupling loops 202 and 204. FIG. 20 shows the coupling arrangement in section and FIG. 21 is a schematic elevational view. The loops 202 and 204 are shown in perspective in FIGS. 22 and 23 respectively. When the rotor 70 is moved closer to one of the magnets 200, the loops 202 and 204 are repelled, causing the rotor to move back toward its position of axial equilibrium.

Figure 25:
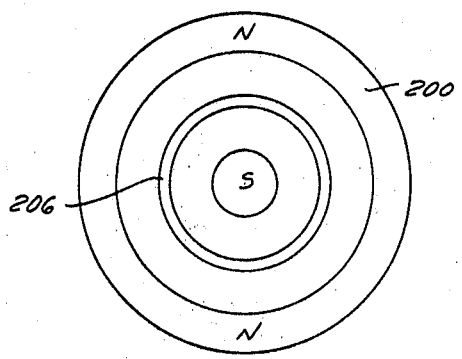
FIG. 25 is an end view of the arrangement shown in FIG. 24.

FIGS. 24 and 25 show the magnet 200 coupled to a ring 206. This arrangement provides axial stabilization in substantially the same manner as the arrangement shown in FIGS. 20—23.

Both arrangements in FIGS. 20—25 require superconducting or other suitable long time constant loops. Alternatively, the magnet 200 requires alternating current excitation.

Figure 26:
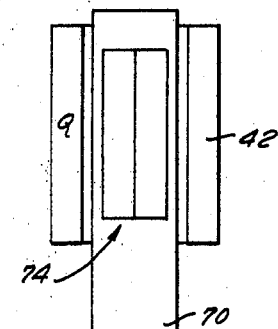
FIG. 26 is an elevational view, partly sectioned, showing an application of the invention to a rotor mounted in a vertical axis.

FIG. 26 is an illustrative application of the invention to a vertical shaft. The radial stabilization is shown to be provided in the same fashion as the horizontal arrangement shown in FIG. 7, although many other radial stabilization schemes may be substituted. Any of the arrangements for providing axial stability in accordance with the invention may be provided to support the weight of the rotor assembly. The rotor is at equilibrium in the vertical direction when the weight of the rotor is balanced by the upward thrust of the axial stabilization system, which system is indicated schematically by a magnet 260 rigidly attached to the stator and a loop 262 rigidly attached to the rotor 70. In systems in which the weight of the rotor is not too great, a simple type of repulsion device will suffice to suspend the rotor.

PROGRAMMING

In general, in all embodiments of the invention, the location of the equilibrium position can be changed as desired by adjusting or programming the configuration of the primary magnetic field. As indicated above, in the case of a bearing, the rotor can be given a truly central position of equilibrium, so that the weight of the rotor need not cause it to sink below the central axis of the stator. Also, if desired, the movable member may be given considerable freedom of motion so that it can be moved to any desired location within its range at any time or in accordance with a program, using a known programming system or device to control the location of the movable member at all times.

Figure 27:
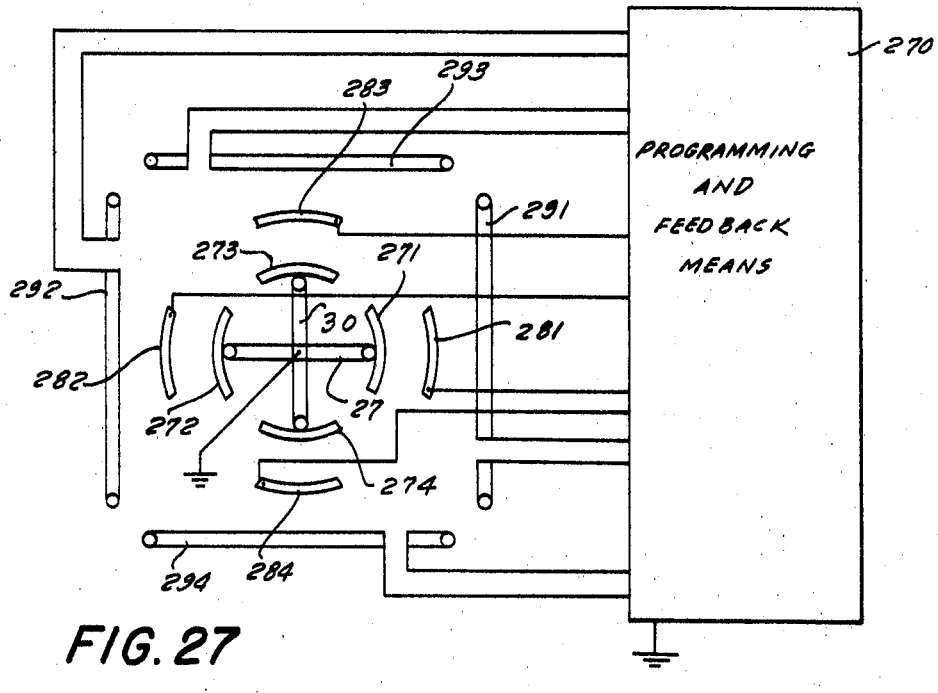
FIG. 27 is a schematic diagram of an electromagnetic positioning system, together with programming and feedback means in block form, for controlling the position of the positioning system as a function of time.

FIG. 27 is illustrative of a system for controlling the location of a movable member as a function of time, by means of any known programming and feedback device, the latter being represented by a block 270. The movable member is shown comprising the inductive loops 27 and 30. At the loop extremities adjacent to the magnetic poles are provided electrostatic plates 271, 272, 273, and 274, which cooperate with stator electrostatic plates 281, 282, 283 and 284, respectively, to sense radial movements of the rotor, in known manner utilizing detecting means contained in the block 270 to which the plates 281, 282, 283 and 284 are shown connected by individual leads. The plates 271, 272, 273 and 274 are connected through the rotor structure and ground to the block 270. The quadrupole primary field is provided by four separate loops 291, 292, 293 and 294, each of which loops is supplied by separate alternating current sources within the block 270. Each loop is broken open at one point where a pair or wires are attached which run to the block 270. Within the block 270, means are provided to vary the amplitude of the current supplied to each primary loop in accordance with sensed variations in the spacings between the electrostatic plates in each pair to vary the magnetic strength of individual poles of the multipole component of magnetic field so as to maintain the movable member in the desired location as a function of time.

In known manner, the block 270 is provided with a stored program of signals representing desired coordinates of the position of the movable member as a function of time. There is also provided in the block 270, in known manner, means to compare the program signals continuously with the sensed spacings between the plates in the various pairs. When a deviation from the program is detected, changes are automatically made in the energization of the respective magnet loops in such manner as to keep the movable member always substantially in the desired position.

Alternatively, the position sensing electrodes 271—274 and 281—284 can be replaced either by inductive loops on the secondary structure which sense their location with respect to the primary field, or by inductive loops on the primary structure which sense their location with respect to the secondary field. One specific embodiment is a second pair of loops similar to the loops 27 and 30, each concentric with one of the loops 27 and 30 and in the respective plane thereof.

The position sensors of whatever form can control known types of feedback amplifiers so as to supply at all times to the positioning loops 27 and 30, respectively, the proper currents to make the loops 27 and 30 behave in stable manner like nonresistive inductive loops regardless of the actual resistance in the positioning loops.

GENERAL CONSIDERATIONS

An identical pair of dipole loops mounted concentrically at 90° with respect to each other as shown in FIG. 4 can be shown to provide a torque-free harmonic type suspension in a quadrupole magnetic field.

FIG. 28 shows two closed inductive quadrupole loops 280 and 280', each similar to the loop 130 shown in FIG. 14, mounted concentrically and spaced circumferentially at 45° to each other.

It can be shown that the pair of loops of FIG. 28, if placed in a six-pole magnetic field will provide torque-free suspension with harmonic restoring forces. Such a substitution can readily be made in the structure of FIG. 4, by replacing the four-pole primary magnet 42 by a six-pole magnet and substituting for the pair of dipole loops 27 and 30 the pair of quadrupole loops 280 and 280' shown in FIG. 28.

More than six poles can be used, in which case, instead of the two quadrupole loops used with the six-pole primary magnet, there can be used two multipole loops each of which latter loops contains two less poles than the number of poles in the primary magnetic field. The two multipole loops, as before, have their axial conductors interspersed around the circumference of the loop structure and uniformly spaced in the manner shown for two quadrupole loops in FIG. 28.

It is evident that substantially identical and symmetrically mounted loop pairs are required for configurations where it is desired to provide symmetry about the axis of rotation. If the invention is employed in a nonrotating or translational manner, it is not necessary to provide equal restoring forces in all directions. For example, a pair of dipole loops in a quadrupole field in such case could be of unequal size.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

I claim:

1. An electromagnetic positioning and stabilizing system, comprising, in combination, first and second members, said first member comprising two closed inductive loops having a common central axis and inclined to each other at a material angle, means integral with said second member for generating a multipole component of magnetic field, said second member at least partially surrounding said first member and said first member being located at least partially within the magnetic field of said second member, said first and second members cooperating to provide forces for determining the relative position of said members in radial directions with respect to said common axis, and means to cause electromagnetic interaction between said first and second members to generate the required positioning and stabilizing forces therebetween.

2. Apparatus in accordance with claim 1, in which the said inductive loops are substantially at right angles with each other.

3. Apparatus in accordance with claim 1, together with axial positioning and stabilizing means to position and stabilize the relative position of said first and second members along the direction parallel to said common central axis.

4. Apparatus in accordance with claim 1, together with programming means for controlling the magnetic strength of individual poles of said multipole component of magnetic field, thereby to vary the relative position of said first and second members as a desired function of time.

5. Apparatus in accordance with claim 4, together with means for continuously sensing the relative position of said first and second members, and feedback means for detecting deviation of said relative position from a predetermined program of relative position as a function of time.

6. Apparatus in accordance with claim 3, in which said axial positioning and stabilizing means comprises means energized by electromagnetic interaction between a portion of said first member and the magnetic field of said second member to provide a restoring force along said common axis.

7. Apparatus in accordance with claim 3, in which said axial positioning and stabilizing means comprises an additional inductive loop rigidly attached to said first member, in electromagnetic interaction relationship to the magnetic field of said second member.

8. Apparatus in accordance with claim 3, in which said axial positioning and stabilizing means comprises a dipole magnet rigidly attached to said second member, together with an inductive loop rigidly attached to said first member and noncentrally located within the magnetic field of said dipole magnet.

9. Apparatus in accordance with claim 3, together with means to produce a dipole magnetic field asymmetrically located with respect to said first member.

10. Apparatus in accordance with claim 1, in which the said common central axis is substantially vertical, and in which there is an additional element comprising means employing an electromagnetic restoring force to support the weight of said second member and attachments thereof and for positioning and stabilizing said second member in the vertical direction.

11. Apparatus in accordance with claim 1, together with a third member substantially like said first member and mounted upon a common central axis with said first member, a fourth member substantially like said second member, located within the magnetic field of said third member and cooperating therewith to provide forces for determining the relative position of said third and fourth members, together with means to provide axial positioning and stabilizing of said second and fourth members as a unit with respect to said common axis.

12. Apparatus in accordance with claim 1, in which at least one of said first and second members comprises superconducting means.

13. Apparatus in accordance with claim 1, comprising means integral with said second member for generating a quadrupole component of magnetic field.

14. Apparatus in accordance with claim 1, comprising a rotor and a stator wherein said rotor is attached to only one of said first and second members and said stator is attached to the other of said members, whereby said rotor is electromagnetically suspended and the axis of rotation of said rotor is radially stabilized with respect to the central axis of said stator.

15. Apparatus in accordance with claim 1, comprising means integral with said second member for generating a sixpole magnetic field and in which said first member comprises a pair of quadrupole loops at substantially 45° with respect to each other.

16. Apparatus in accordance with claim 1, in which said first member includes two resistive damping, auxiliary loops connected in series opposition to each other, said loops being positioned in portions of said magnetic field of opposite polarity whereby substantially no net current flows in said damping auxiliary loops when said first member is in an equilibrium position but whereby when said first member is disturbed from its equilibrium position a net current flows through said last-mentioned loops to provide a restoring force thereon.

UNITED STATES PATENT OFFICE
CERTIFICATE OF CORRECTION

Patent No. 3,572,854         Dated March 30, 1971

Inventor(s)  Gordon T. Danby

It is certified that error appears in the above-identified patent and that said Letters Patent are hereby corrected as shown below:

Column 1, line 38, "Jul." should be -- July, --;

Column 3, line 10, "since" should be -- sine --;

Column 3, line 57, "there therebetween" should be -- therebetween --;

Column 5, line 60, "(X-w,y)" should be -- (x-w,y) --;

Column 5, line 63, "$I_{S1} = 0i + 0j + (2wG/L)k$" should be -- $I_{S1} = 0i + 0j + (2w\dot{G}/L)yk$ --;

Column 5, line 68, "$B_1 = -G(X+w)i + Gyj + 0k.$" should be -- $B_1 = -G(x+w)i + Gyj + 0k.$ --;

Column 5, line 74, "$F_1 = -(2wGy^2/L)i-(2wG^2xy/L)j-(2w^2G^2/L)yj$" should be -- $F_1 = -(2wG^2y^2/L)i - (2wG^2xy/L)j -(2w^2G^2/L)yj$ --;

Column 6, line 5, "$F_2 = +(2wGy^2/L)i+(2wG^2xy/L)j-(2w^2G^2/L)xj$" should be -- $F_2 = +(2wG^2y^2/L)i + (2wG^2xy/L)j -(2w^2G^2/L)yj$ --;

Column 6, line 13, "$F_1 = Dy^2i - Dxyj - Cyj$" should be -- $F_1 = -Dy^2i - Dxy - Cyj$ -- ;

UNITED STATES PATENT OFFICE
CERTIFICATE OF CORRECTION

Patent No. 3,572,854　　　　　　　　Dated March 30, 1971

Inventor(s) Gordon T. Danby

It is certified that error appears in the above-identified patent and that said Letters Patent are hereby corrected as shown below:

Column 6, line 51, "(x,4+w)" should be -- (x,y+w) --;

Column 6, line 55, "$F_3 = -Dxyi - Dx^2j$" should be -- $F_3 = -Dxyi - Cxi - Dx^2j$ --;

Column 7, line 44, "shown shown schematically" should be -- shown schematically --;

Column 7, lines 69, "Dr. J. T. powell" should be -- Dr. J. R. Powell --;

Column 9, line 66, "magnetic for field" should be -- magnetic field --;

Column 10, line 12, after "primary" delete "a";

Column 10, line 13, "magnetic fil field" should be -- magnetic field --.

Signed and sealed this 12th day of October, 1971.

(SEAL)
Attest:

EDWARD M. FLETCHER, JR.　　　　ROBERT GOTTSCHALK
Attesting Officer　　　　　　　　Acting Commissioner of Pate